United States Patent Office 3,577,421
Patented May 4, 1971

---

3,577,421
PIPERAZINE SUBSTITUTED DITHIOSEMI-CARBAZONES
Paul Anthony Barrett, London, England, assignors to Burroughs Wellcome Co., Triangle Park, N.C.
No Drawing. Filed May 18, 1966, Ser. No. 550,934
Claims priority, application Great Britain, May 25, 1965, 22,006/65
The portion of the term of the patent subsequent to Nov. 11, 1986, has been disclaimed
Int. Cl. C07d 51/70
U.S. Cl. 260—268          5 Claims

ABSTRACT OF THE DISCLOSURE

A compound

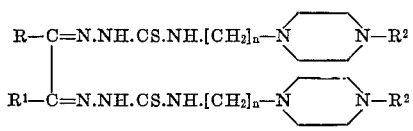

where R and $R^1$ are hydrogen, alkyl, cyclohexyl, benzyl, phenyl, halogen substituted phenyl or alkyloxyalkyl, $R^2$ is lower alkyl and $n$ is a number from 1 to 8. The compounds are useful in the treatment of coccidiosis.

---

This invention relates to α-dithiosemicarbazones which have activity against coccidiosis.

The compounds are of Formula I below:

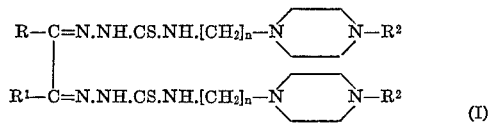

(I)

wherein R and $R^1$ are the same or different and each is a hydrogen atom or an alkyl, cyclohexyl, benzyl, phenyl, halogen substituted phenyl, or alkyloxyalkyl group, $R^2$ is an alkyl group, and $n$ has an integral value from 1 to 8, preferably 2 to 5.

In the above definition, "alkyl" means a straight or branched chain alkyl group of 1 to 6 carbon atoms.

The compounds are basic and may be presented as acid addition salts: the acid moiety should be chosen so that the acid addition salt is still pharmacologically acceptable to animals, but otherwise the acid used is of no consequence; for example hydrochloric acid, oxalic acid, or sulphuric acid may be used in the ratio of 1 to 4 equivalents of acid to 1 equivalent of a compound of Formula I. However, there is no apparent advantage in using acid addition salts and the basic compounds of Formula I are preferred.

Those compounds wherein both R and $R^1$ are hydrogen atoms are less active than the other compounds of Formula I. The preferred compounds are those wherein R and $R^1$ are the same or different and each is a methyl or phenyl group. The particularly preferred compounds are acetylbenzoyl di-4-β-(4-methylpiperazinyl-1)ethyl-thiosemicarbazone, acetylbenzoyl di-4-β-(4-ethylpiperazinyl-1)ethylthiosemicarbazone, biacetyl di-4-β-(4-ethylpiperazinyl-1)ethylthiosemicarbazone and acetylbenzoyl di-4-β-(4-n-propylpiperazinyl - 1)ethylthiosemicarbazone: an especially preferred compound is acetylbenzoyl di-4-β-(4-methylpiperazinyl-1)ethylthiosemicarbazone.

Thus in one aspect this invention provides the compounds of Formula I and in particular those stated above to be preferred.

Coccidiosis is a disease of considerable economic importance in domestic animals throughout the world, particularly in all forms of poultry, and is caused by members of the genera Eimeria and Isospora of the taxonomic group Cocidia.

The activity of the compounds was first detected by administering the basic compounds in the diet to chicks infected with Eimeria tenella; the compounds were effective in halting the development of the disease. The basic compounds were then administered at concentrations between 0.003 and 0.05% w./w. of the food to birds artificially infected with Eimeria spp. As an illustration of the degree of activity, 668C64 was prophylactically active at 0.003 to 0.007% against E. tenella and E. maxima and at 0.005 to 0.015% against E. acervalina and E. necatrix. This compound and other compounds of Formula I were also active against other forms of coccidia and in other animals than poultry. Higher doses were needed when using some of the less preferred compounds of Formula I, and when acid addition salts were used the doses had to be correspondingly increased to allow for the inactive acid part of the molecule.

If only E. tenella and E. maxima are to be controlled doses of 0.005% w./w. of 668C64 in the food or approximately 50 gm. of drug per ton of food can be successfully used under controlled conditions, but under field conditions doses up to 100 gm. are preferred. If other species are to be controlled higher doses are needed such as 100 to 200 gm. of drug per ton of food.

However the compounds of Formula I may be added to other coccidiostats to obtain a broad spectrum coccidiostat. Thus for example the compounds may be mixed with sulphaquinoxaline or with a synergistic combination of sulphaquinoxaline and diaveridine or with other known coccidiostats. The doses needed will then vary according to the quantity of the other coccidiostatic agent present and its degree of activity. The effects of the compounds of Formula I with other coccidiostats seem to indicate that the activities are purely additive.

The compounds of Formula I are administered orally and can be presented alone, in a pharmaceutical formulation, as additive to the animals food or drink or as a final food or drink containing the compound.

The dose of ocmpound required is such that it is not normally convenient to administer the compound alone except under laboratory conditions. Examples of pharmaceutical formulations containing a compound of Formula I are tablets, capsules, granules, powders suspensions, solutions and emulsions which may contain diluents, binding agents, dispersing agents, surface active agents, lubricating agents, coating materials, flavouring agents, colouring agents, solvents, thickening agents, suspending agents or other pharmaceutically acceptable additives and these formulations may be presented in unit dose form or multi-dose form. The formulations may also contain other coccidiostats or other active additives such as antibiotics, vitamins, minerals or other therapeutic agents, though special care must be taken to ensure that the ingredients are compatible.

However, the compounds are preferably presented as an additive to be mixed with the animal's food or drink. This additive may itself be a pharmaceutical formulation as described above or it may be a concentrated food "pre-mix" drink additive which contains the compound of Formula I in a diluted form compared with the compound alone but in a more concentrated form than will be finely administered to the animal. This method of presentation is particularly suitable for use with poultry. As a food "pre-mix," the compound together with any other compatible active agents such as other coccidiostats, antibiotics, vitamins or minerals which are required, are mixed with carriers or diluents such as bran, ground maize, barley or other corn, wheat shorts, husks, edible vegetable substances, fluor, soya bean flour, crumbs and similar food stuffs and possibly other diluents such as crushed limestone and grits, and the components are thoroughly mixed by conventional techniques such as grinding, stirring, milling or tumbling. The mixture is then presented as a powder or other small particulate composition or it may be further processed into pellets or similar food additives. This food "pre-mix" is then added to other foods at the concentration of say 1 lb. of pre-mix per cwt. of food depending on the concentration of the active components in the pre-mix. It will be appreciated that pre-mixes can be prepared at all concentrations between the compound of Formula I with traces of diluents up to foods practically in their final form. Alternatively, of course, ready mixed foods containing the compound of Formula I in a form suitable for direct administration to the birds may be produced. If the compounds of Formula I are presented as drink additives they are normally in the form of their acid addition salts. The substance may be presented in a finely divided solid form, optionally together with other soluble additives, or it may be presented as a "concentrate" containing the compound in solution in suitable solvents. This powder or concentrate is then added to the water. This method of presentation in the form of a drink additive is not as suitable as a food additive because the uptake of drink by poultry is more variable than food intake, and hence prophylactic dosing is not as accurate.

Thus in another aspect this invention provides a method for the prevention of coccidiosis in domestic animals, particularly in poultry, which comprises orally administering a compound of Formula I to the animal or bird at risk.

In another aspect the invention provides formultions for oral administration to animals which contain a compound of Formula I.

In yet another aspect the invention provides a method of making such formulations which comprises incorporating the compound into the formulation by known pharmaceutical or food preparation techniques.

Particularly the invention provides the above embodiments wherein the compounds of Formula I is one of the preferred compounds.

The compounds of Formula I are prepared by reacting in acid solution a glyoxal of Formula II with two molecular proportions of a 4-substituted thiosemicarbazide of Formula III.

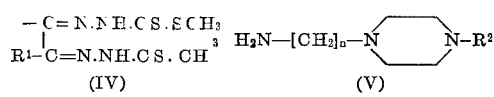

wherein R, $R^1$, $R^2$ and $n$ have the above defined meanings. The proportions of the compounds (II) and (III) should preferably be calculated to be in the correct ratio of 1 equivalent of (II) to 2 equivalents of (III). If excess of (II) is present some mono-thiosemicarbazone may be produced and if an excess of (III) is present this acts as a contaminant in the purification of the product of Formula I; otherwise the proportions are not critical. The choice of solvent is not critical and any suitable solvent which doesn't enter into the reaction may be used, though ethanol is convenient and is preferred. The thiosemicarbazides of Formula III are basic substances and the pH of the mixture of reactants and solvents should be on the acid side; very strong acids might give rise to side reactions and so weakly acid solutions are preferred, with hydrochloric acid as a convenient acid to use, though this is not critical. Many of the diketones of Formula II are oils which do not necessarily go into solution before the reaction, and references to suitable solvents should be construed in the context of the compounds of Formula III and the products of Formula I. The reaction is effected by heating the reactants together in the presence of the acidified solvent. With some glyoxals of Formula II the reaction is complete in a few minutes but with less soluble glyoxals it can take longer: in practice heating for ½ hour ensures that the reaction is complete. The products of Formula I are usually soluble in the form of their acid addition salts in the hot acidic solvent medium. Thus the mixture may need to be cooled and made basic to separate the product. A less satisfactory method is to evaporate off the solvent leaving the acid addition salt of the compound of Formula I. The compounds of Formula I may be purified by recrystallisation from a suitable solvent such as ethyl acetate or by other conventional techniques.

Thus in another aspect this invention provides a method of preparing a compound of Formula I substantially as described above.

Alternatively the compounds of Formula I may be synthesised by reacting one molecule of the appropriate glyoxal bis(methylcarbodithioylhydrazone) of Formula IV with two molecules of the appropriate ω-4'-alkylpiperazin-1'-ylalkylamine of Formula V, thereby eliminating methylmercaptan to produce the dithiosemicarbazone of Formula I.

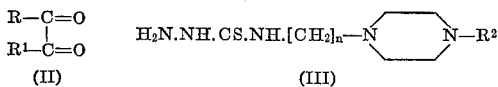

The reaction may be effected by heating the reactants together, preferably in a suitable solvent. Most of the compounds of Formula IV are solids and most of the amines of Formula V are liquids. If a solvent is used it should be chosen as one which can not enter into the reaction and which has a boiling point below that of the amine of Formula V, but preferably high enough to allow a suitable reaction temperature to be used, as the reaction is not always a fast one: ethanol is such a suitable solvent but one should avoid ketones and aldehydes. It is necessary to heat the reactants together for periods between ½ hour and 8 hours to get good yields. The solid product of Formula I separates from the solution and after cooling this can be filtered off. The compounds of Formula IV which are also solids are not soluble in hydrochloric acid and any unchanged starting material of Formula IV can be removed from the compounds of Formula I by dissolving the product in hydrochloric acid and filtering off the starting material. The basic compound of Formula I can be precipitated again by making the solution basic: it can then be purified by conventional techniques. Alternatively the compound of Formula I may be extracted from the initial reaction mixture by distilling off excess solvent, solvent extracting the product of Formula I with a selective solvent such as chloroform and recovering and purifying the compound of Formula I by conventional techniques. The former method of working up the product is preferred.

Thus in yet another aspect this invention provides the above described alternative synthesis of the compounds of Formula I.

The second synthesis is not as convenient as the first described method.

Having now described the invention, the following examples illustrate in more detail the preparation of the compounds of Formula I.

EXAMPLE 1

(1a) Preparation of 4-β-(4-methylpiperazinyl-1) ethylthiosemicarbazide

Acetophenone methylcarbodithioylhydrazone (116 g.) (prepared by the method of Kazakov and Postovskii, Doklady Akad. Nauk S.S.S.R., 1960, vol. 134, 824— abstracted in C.A., 1961, 55, 6483a) and 1-methyl-4-β-aminoethylpiperazine (73 g.) in methanol (600 ml.) were boiled under reflux for 7 hours. The methanol was removed by distillation in vacuo. The residual solid was sucked free of a little oily impurity, washed with 100 ml. of ether, and recrystallised from a mixture of equal parts of benzene and light petroleum (B.P. 80–100° C.) to give acetophenone 4-β-(4-methylpiperazinyl-1)ethylthiosemicarbazone as colourless crystals, M.P. 167–168° C.

Acetophenone 4-β(4 - methylpiperazinyl - 1)ethylthiosemicarbazone (31.9 g.) was dissolved in water (150 ml.) and concentrated hydrochloric acid (20 ml.) and submitted to steam distillation till no more acetophenone was present in the distillate. The pH of the solution before steam distillation is begun should be about 1–2, and after completion of the distillation about 2–3. The product in solution is 4-β-(4-methylpiperazinyl-1)ethylthiosemicarbazide as its dihydrochloride, acid addition salt.

As an optional step, the solution of 4-β-(4-methylpiperazinyl-1)ethyl thiosemicarbazide dihydrochloride resulting from the steam distillation was evaporated to dryness in vacuo, the oily residue dried by the distillation from it of several portions of methanol, and finally obtained in crystalline form by prolonged boiling with dry methanol. The colourless solid was filtered, washed and dried to give 4-β-(4-methylpiperazinyl-1)ethyl thiosemicarbazide dihydrochloride, M.P. 180–181° C.

(1b) Reaction of acetylbenzoyl with thiosemicarbazide from 1a) to give acetylbenzoyl di-4-β-(4-methylpiperazinyl-1)ethyl-thiosemicarbazone Acetyl benzoyl (7.4 g.), dissolved in a few ml. of ethanol, was added to the solution of 4-β-(4-methylpiperazinyl - 1)ethyl thiosemicarbazide dihydrochloride resulting from the steam distillation above and the mixture was boiled under reflux for ½ hour with vigorous stirring. The solution was cooled and basified strongly by addition of a large excess of saturated sodium carbonate solution. The dithiosemicarbazone which separated in gelatinous form, slow to filter, was extracted with chloroform, the chloroform solution dried and the solvent removed by distillation to give an oil which rapidly solidified and was recrystallised (preferably after grinding and washing with a little ether) from ethyl acetate to give acetylbenzoyl di-4-β-(4-methylpiperazinyl-1)ethylthiosemicarbazone as almost colourless needles, M.P. 181–182° C.

Alternatively, the required dithiosemicarbazone was separated from some monothiosemicarbazone, which invariably contaminates it, by solution in the theoretical amount of 2 N-hydrochloric acid necessary to convert to its dihydrochloride, evaporation to dryness, and recrystallisation from ethanol containing a little water, to give acetylbenzoyl di-4 - β - (4 - methylpiperazinyl-1) ethylthiosemicarbazone dihydrochloride as pale yellow plates, M.P. 201–202° C.

If the optional step of separating the thiosemicarbazide intermediate of part (1a) was carried out, this was then reacted with the theoretical amount of acetylbenzoyl as described above, to give the required dithiosemicarbazone.

EXAMPLES 2–13

By the method described in the first paragraph of Example (1a) the following novel intermediates of the general formula

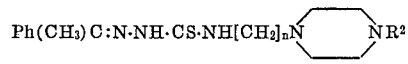

| Intermediate example | n | R² | Solvent for crystallisation | M.P., °C. |
|---|---|---|---|---|
| (i) | 2 | Et | Benzene/petroleum ether (B.P. 60–80° C.). | 145–147 |
| (ii) | 2 | n-Pr | ....do.... | 132–133 |
| (iii) | 2 | Iso-Pr | Methanol | 165 |
| (iv) | 3 | Me | Benzene/petroleum ether (B.P. 60–80° C.). | 108 |

They were then converted to the appropriate thiosemicarbazide salt as described in the second paragraph of (1a). Using one of these intermediates and the appropriately substituted glyoxal of the formula $R^1.CO.CO.R^2$, the following dithiosemicarbazones of the general formula

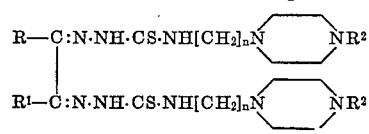

were prepared by the methods of Example (1b).

In most cases it was not necessary to chloroform extract the precipitated dithiosemicarbazone after basification of the initial reaction solution; the product was simply filtered off and purified by recrystallisation.

| Example | B.W. ref. No. | R | R¹ | n | R² | Solvent for crystallisation | M.P., °C. (decomp.) |
|---|---|---|---|---|---|---|---|
| 2 | 118C66 | H | H | 2 | Me | Ethanol | 228–229 |
| 3 | 119C66 | H | Me | 2 | Me | Aqueous ethanol | 234–235 |
| 4 | 175C66 | H | CH₃ \| EtOCH | 2 | Me | do | [1] 160–165 |
| 5 | 152C66 | H | Cyclohexyl | 2 | Me | Ethyl acetate | 189–190 |
| 6 | 667C64 | Me | Me | 2 | Me | Chloroform/methanol | 259 |
| 7 | 559C65 | Me | Me | 2 | Et | ....do.... | 253 |
| 8 | 149C66 | Me | Me | 2 | n-Pr | ....do.... | 240 |
| 9 | 560C65 | Me | Ph | 2 | Et | Ethyl acetate | 153–151 |
| 10 | 150C66 | Me | Ph | 2 | n-Pr | ....do.... | 165–166 |
| 11 | 169C66 | Me | p-ClPh | 2 | Me | Ethanol | 207–208 |
| 12 | 153C66 | Me | PhCH₂ | 2 | Me | Methanol | 190–195 |
| 13 | 179C66 | PhCH₂ | PhCH₂ | 2 | Me | Ethanol | 219 |
| 14 | 236C66 | Me | Me | 2 | Iso-Pr | Cellosolve [2] | 232 |
| 15 | 38C65 | Me | Me | 3 | Me | Ethanol | 205 |
| 16 | 118C65 | Me | Ph | 3 | Me | Benzene/petroleum ether [3] | 140 |

[1] Diacid oxalate.
[2] Cellosolve is the U.S. Registered Trademark of Union Carbide Ltd. for 2-ethoxyethanol.
[3] B.P. 60–80° C.

EXAMPLE 17

A hot solution of methyl dithiocarbazinate (42 g.) in ethanol (100 ml.) containing 5 drops of concentrated hydrochloric acid was prepared and to this a solution of diacetyl (14.8 g.) in ethnaol (400 ml.) was added dropwise with stirring over a period of 15 minutes. Butane-2,3-dione-bis-(methylcarbodithioyl hydrazone) began to separate during the addition. The mixture was heated under reflux for a further 1 hour and then the hydrazone was filtered off and washed with hot ethanol. It had a melting point of 220° C. with decomposition.

A mixture of this butane-2,3-dione bis-(methylcarbodithioyl hydrazone) (4 g.) with 1-β-aminoethyl-4-methylpiperazine (5.9 g.) in ethanol (20 ml.) was boiled under reflux for 8 hours. During this period the product separated from solution. After cooling, the mixture was filtered. The solid was dissolved in 0.5 N-hydrochloric acid (50 ml.), some insoluble material was filtered off and discarded, the solution was made basic by addition of sodium carbonate solution, and the precipitated base was filtered off, dried, and recrystallised from "Cellosolve" (see above=2-ethoxyethanol) to give butane-2,3-dione di - (4-β-4'-methyl-1'-piperazinoethylthiosemicarbazone) (B.F. ref. no. 667C64) which had a melting point of 259° C. with decomposition.

EXAMPLE 18

Benzil bis-(methylcarbodithioyl hydrazone), M.P. 180–181° C. (decomp.) was prepared by a similar method to that described in the first part of Example 17. 12 g. of this were suspended in a mixture of 4-methyl-1-β-aminoethylpiperazine (45 g.) and ethanol (45 ml.) and the mixture was boiled under reflux for 1 hour. The ethanol was removed by distillation under a water pump vacuum. The residue was diluted with water, the oil extracted with chloroform, and the chloroform solution washed with water, dried and evaporated, to give a viscous residue. The latter as dissolved in a little ethanol. Addition of light petroleum (B.P. 46–60° C.) precipitated crystalline material which was recrystallised from a mixture of benzene and light petroleum (B.P. 46–60° C.) to give benzil di-4-β-(4-methylpiperazinyl-1)ethyl - thiosemicarbazone (B.W. ref. no. 176C66) as yellow prisms, M.P. 207–208° C. (decomp.).

What we claim is:
1. A compound of Formula I or a pharmacologically acceptable acid addition salt thereof:

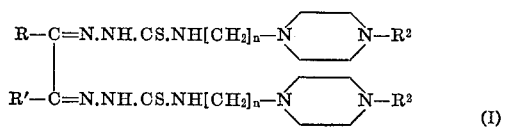

(I)

wherein R and R' are the same or different and each is a methyl or phenyl group, $R^2$ is a lower alkyl group and $n$ has an integral value from 1 to 8.

2. Acetylbenzoyl di - 4 - β - (4 - methylpiperazinyl-1) ethylthiosemicarbazone and pharmacologically acceptable acid addition salts thereof.

3. Acetylbenzoyl di - 4 - β - (4 - ethylpiperazinyl-1) ethylthiosemicarbazone and pharmacologically acceptable acid addition salts thereof.

4. Acetylbenzoyl di - 4 - β - (4 - n - propylpiperazinyl-1(ethylthiosemicarbazone and pharmacologically acceptable acid addition salts thereof.

5. Biacetyl di - 4 - β - (4 - ethylpiperazinyl - 1)ethylthiosemicarbazone and pharmacologically acceptable acid addition salts thereof.

References Cited

UNITED STATES PATENTS

| | | | |
|---|---|---|---|
| 2,657,234 | 10/1953 | Klarer et al. | 260—552 |
| 3,374,234 | 3/1968 | Arya | 260—247.1 |
| 3,382,275 | 5/1968 | Barrett | 260—552 |
| 3,354,156 | 11/1967 | Wenot | 260—268X |

FOREIGN PATENTS

| | | | |
|---|---|---|---|
| 1,298,323 | 6/1962 | France | 260—552 |
| 1,441,176 | 4/1966 | France | 262—552 |

DONALD G. DAUS, Primary Examiner

U.S. Cl. X.R.

260—246B, 268PA, 552R, 552SC; 424—250